United States Patent

Matsuno et al.

[11] Patent Number: 6,073,503
[45] Date of Patent: Jun. 13, 2000

[54] CAM DEVICE

[75] Inventors: Yoshihiro Matsuno; Toru Miyajima; Michio Ueda, all of Itano-gun, Japan

[73] Assignee: Shikoku Kakoki Co., Ltd., Tokushima, Japan

[21] Appl. No.: 09/034,408

[22] Filed: Mar. 4, 1998

[30] Foreign Application Priority Data

Mar. 5, 1997 [JP] Japan ................................. 9-050142

[51] Int. Cl.$^7$ ................................................. F16H 25/16
[52] U.S. Cl. ..................................... 74/55; 74/53; 74/569
[58] Field of Search ....................... 74/53, 54, 55, 74/567, 569

[56] References Cited

U.S. PATENT DOCUMENTS

| | | |
|---|---|---|
| 290,855 | 12/1883 | Campbell ............................... 74/55 X |
| 3,413,862 | 12/1968 | Waara . |
| 3,848,473 | 11/1974 | Diepeveen .............................. 74/55 X |
| 4,385,649 | 5/1983 | Ševčik ..................................... 74/55 X |
| 4,625,575 | 12/1986 | Le Bras ................................. 74/567 X |
| 5,456,128 | 10/1995 | Thünker ..................................... 74/53 |

FOREIGN PATENT DOCUMENTS

| | | |
|---|---|---|
| 33 29 122 | 2/1985 | Germany . |
| 2 194 754 | 3/1988 | United Kingdom . |

*Primary Examiner*—David M. Fenstermacher
*Attorney, Agent, or Firm*—Armstrong, Westerman, Hattori, McLeland and Naughton

[57] ABSTRACT

A cam device comprises a cam, a follower and elastic means for causing the follower to follow the cam. The cam is in the form of a disk and has in a side surface thereof a cam groove having opposite open ends at the outer periphery of the cam. The cam outer periphery has a portion interconnecting opposite ends of a cam groove-defining inner side face which serves as a cam contour face. The follower carries a roller which fits in the cam groove and moves into contact with the cam contour face. The roller can be retained as positioned in contact with or away from the cam contour face.

4 Claims, 7 Drawing Sheets

CAM DEVICE

BACKGROUND OF THE INVENTION

The present invention relates to a cam device, for example, for driving a container sealing device or container filling device included in packaging machines.

Cam devices of the type mentioned and already known comprise a cam, a follower and an elastic means for causing the follower to follow the cam, the cam being a plate cam having an outer periphery serving as a cam contour face.

Cam devices are known which comprise a plate cam formed with an annular cam groove in one side surface thereof, and a follower having a roller attached thereto and fitting in the cam groove.

With the cam device of the former type, the elastic means needs to have a great elastic force for causing the follower to follow the cam without permitting the follower to move out of a contact with the cam contour face. To give such a great elastic force, the elastic means must be large or elaborate in construction, and driving the cam involves increased load variations, necessitating a greater drive source.

When the operative device to be driven by the latter cam device is to be operated, the follower is prevented from following the cam, and it has been impossible to bring the follower out of the following movement by a simple means.

SUMMARY OF THE INVENTION

An object of the present invention is to provide a cam device which has reduced elastic force of the elastic means for causing a follower to follow the cam and which is nevertheless so adapted that the operative device to be driven by the cam device can be disengaged easily.

The present invention provides cam device comprising a cam, a follower and an elastic means for causing the follower to follow the cam, the cam device being characterized in that the cam is in the form of a disk and has in a side surface thereof a cam groove having opposite open ends at an outer periphery of the cam, the cam outer periphery having a portion interconnecting opposite ends of a cam groove-defining inner side face and serving as a cam contour face, the follower carrying a roller which fits in the cam groove and is movable into contact with the cam contour face, the roller being retainable as positioned in contact with or away from the cam contour face.

With the cam device of the invention, the cam is in the for of a disk and has in a side surface thereof a cam groove having opposite open ends at the outer periphery of the cam. At one side of the center of rotation of the cam, opposite to the cam groove, the cam outer periphery has a portion interconnecting opposite ends of a cam groove-defining inner side face which serves as a cam contour face. The follower has mounted thereon a roller which fits in the cam groove and is movable into contact with the cam contour face. Accordingly, the roller when fitted in the cam groove is forced to move toward a cam lift direction by the cam groove, consequently obviating the need for the elastic force of the elastic means to cause the follower to follow the cam in this state. When in contact with the cam contour face, the roller moves on a circular arc without moving the follower toward the cam lift direction, so that the elastic force of the elastic means for causing the follower to follow the cam can be smaller. These features render the elastic means simplified in construction and diminish the load variations involved in driving the cam, consequently reducing the power required for driving the cam.

Furthermore, the roller is retainable as positioned in contact with or away from the cam contour face, so that when the roller is so positioned, the follower no longer follows the cam. Accordingly, the operative device to be operated by the cam device can be brought to a halt.

In the case where the follower is in the form of a lever or an arm pivotally movable toward or away from the cam, and the elastic means comprises a fluid pressure cylinder having a piston rod connected to the follower, the operative device can be disengaged with ease merely by advancing or retracting the piston rod of the cylinder.

Preferably, the operative device is connected to the follower and has an operating member movable between an operative position where the operating member acts on an object and a nonoperative position. The operating member is reciprocatingly movable between the operative position and a nonoperative position when the roller is fitted in the cam groove, the operative member being located in the nonoperative position when the roller is in contact with the cam contour face.

The operative device is preferably a container sealing device, and the object is a portion of a container to be sealed, the operating member comprising a pair of sealing members positionable at respective opposite sides of the container portion and movable between an open position and a closed position, the operative position being the closed position of the sealing members, the nonoperative position being the open position of the sealing members.

Alternatively, the operative device is a container filling device having a filling nozzle and a metering cylinder housing a piston for feeding a liquid to the filling nozzle in a specified amount at a time by a reciprocating movement of the piston, and the object is the liquid supplied to the metering cylinder, the operating member being a rod connected to the piston, the operative position being a rod retraced position and the nonoperative position being a rod advanced position.

DESCRIPTION OF THE PREFERRED EMBODIMENTS

Embodiments of the invention will be described below with reference to the drawings.

Figure 1:
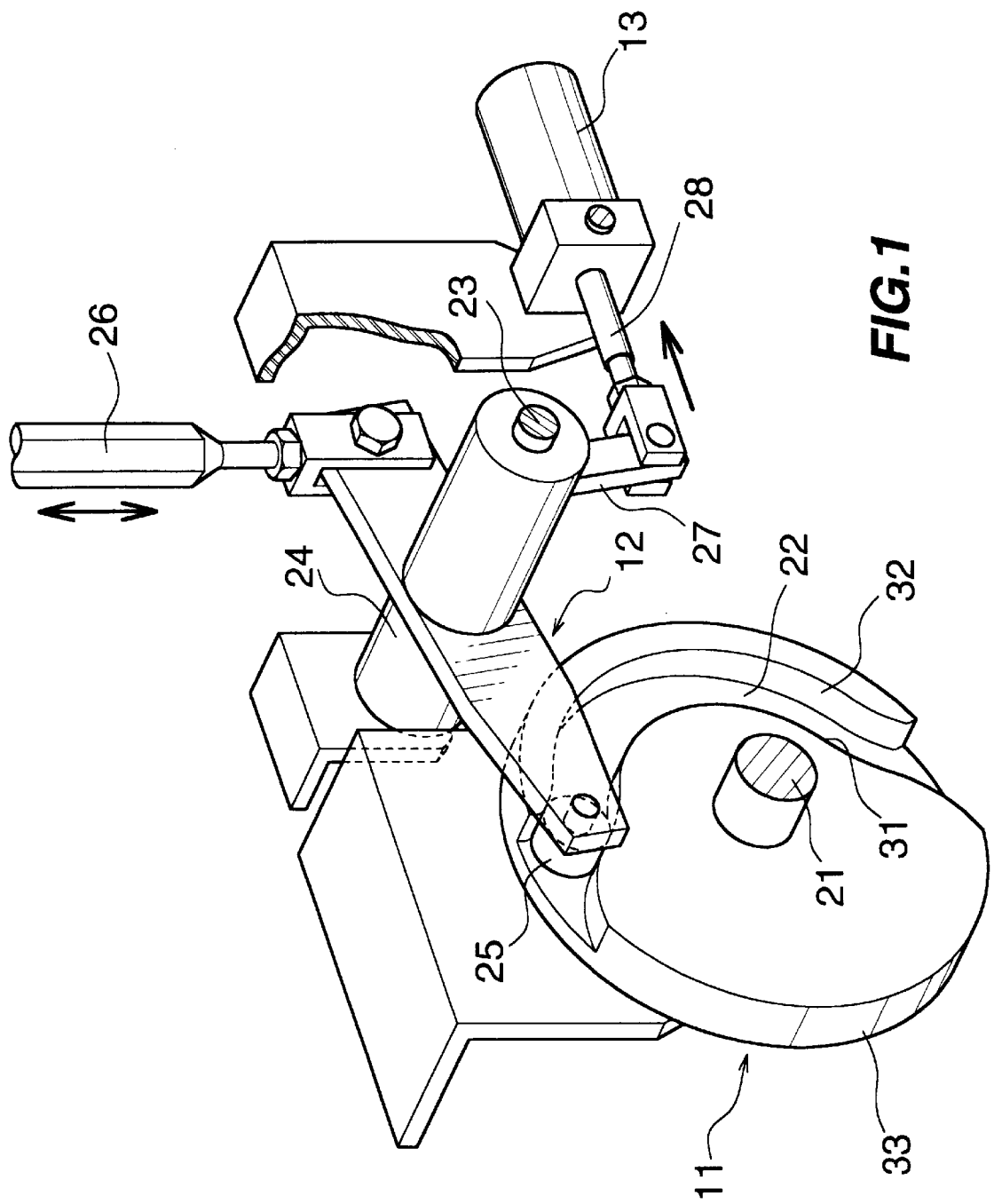
FIG. 1 is a perspective view of a cam device embodying the invention.
Figure 2:
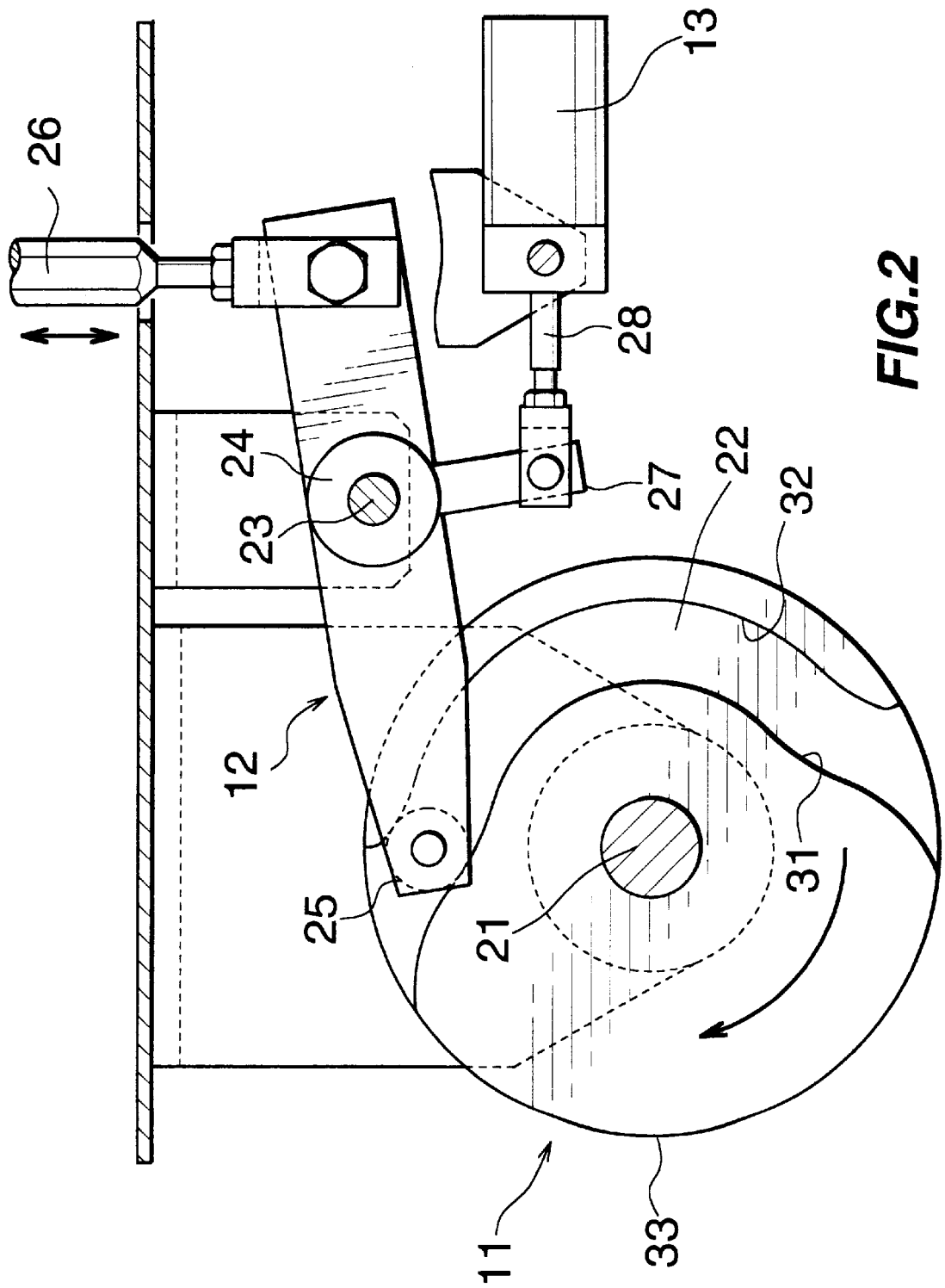
FIG. 2 is a side elevation of the cam device.

FIGS. 1 and 2 show a cam device which comprises a cam 11, a follower 12 and a fluid pressure cylinder 13 for causing the follower 12 to follow the cam 11.

The cam 11, which is in the form of a disk, is fixed to a horizontal drive shaft 21. The cam 11 has a side surface having a cam groove 22, which has opposite open ends at the outer periphery of the cam 11.

The follower 12 is generally in the form of a horizontal lever and is mounted by a boss 24 on a horizontal support shaft 23 parallel to the drive shaft 21. The follower 12 has one end carrying a roller 25 and the other end having attached thereto the lower end of a vertical operating rod 26.

The fluid pressure cylinder 13 has a piston rod 28 connected to the outer end of an arm 27 extending below the mount boss 24.

Figure 3:
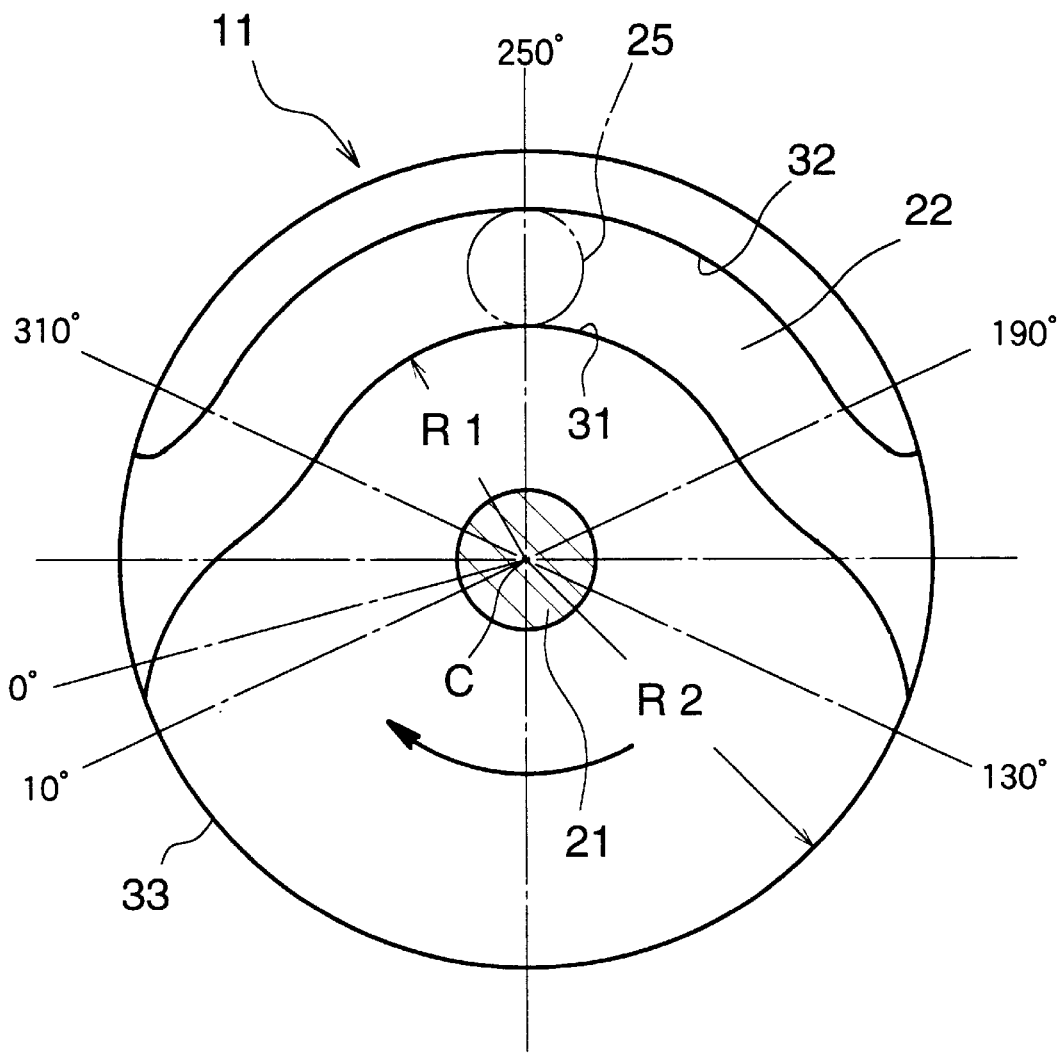
FIG. 3 is a side elevation of a cam included in the cam device.

With reference to FIG. 3, the cam groove 22 is defined by an inner side face 31 and an outer side face 32 extending approximately parallel to each other. At one side of the center of rotation C of the cam 11 opposite to the cam groove 22, the cam outer periphery has a portion interconnecting opposite ends of the groove-defining inner side face 31 which serves as a cam contour face 33. An intermediate portion of the length of the cam groove 22 provides a circular-arc portion (the range of 0 deg. to 310 deg. shown in FIG. 3). At this circular-arc portion, the inner side face 31 has a radius of gyration, R1, which is smaller than the radius of gyration, R2, of the cam contour face 33.

Figure 4:
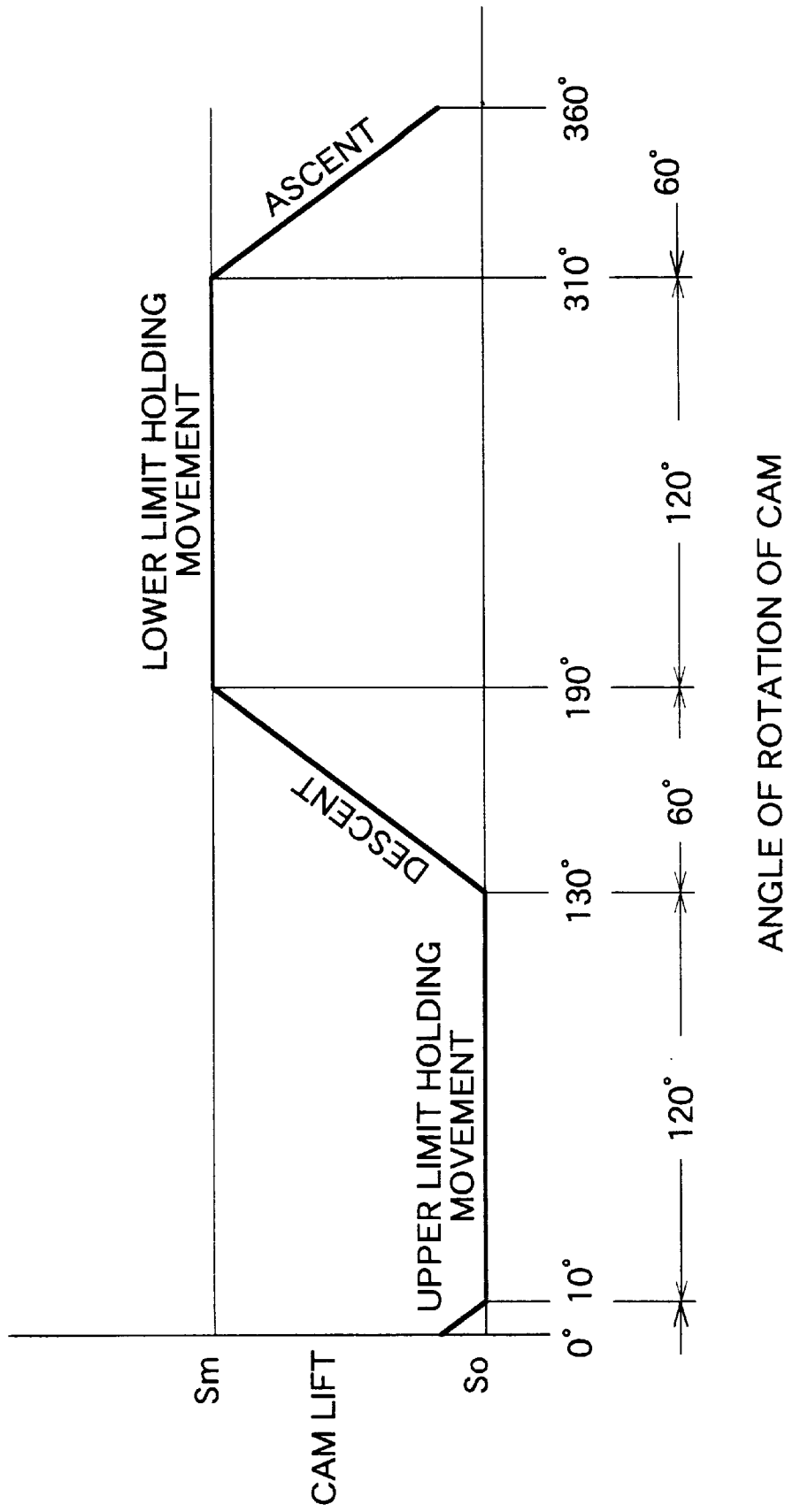
FIG. 4 is a lift diagram of the cam device.

With reference to FIG. 4 in addition to FIG. 3, the cam lift diagram of FIG. 4 will be described. The cam 11 rotates clockwise in FIG. 3. While the roller 25 is in contact with the cam contour face 33, i.e., over the range of 10 deg. to 130 deb., the contact of the roller with the cam holds an upper position, and the cam lift is zero. The range of 130 deg. to 190 deg. provides a descending movement, the range of 190 deg. to 310 deg. a lower position holding movement (with a constant cam lift), and the range of 310 deg. to 10 deg. an ascending movement. Upon moving out of the cam groove 22 at 10 deg., the roller 25 rides onto the cam contour face 33.

When the follower 12 is urged by the cylinder 13 towards the direction of retraction of the piston rod 28, the roller 25 is biased toward the center of the cam. When the cam 11 is rotated in this state, the roller 25 is pressed against the cam contour face 33 and fitted into the cam groove 22, whereby the follower 12 is pivotally moved, following the cam 11. Consequently, the operating rod 26 is moved upwardly and downwardly.

When the piston rod 28 of the cylinder 13 is advanced, holding the roller 25 merely in contact with the cam contour 33 without being pressed there against, or forming a small clearance between the roller 25 and the face 33, the roller 25 moves along the outer periphery of the cam 11 without entering the cam groove 22. This holds the follower 12 out of the pivotal movement, with the operating rod 26 retained in the lower-limit position of its upward-downward stroke. Even if the roller is pivotally moved toward the cam center at this time owing to an unexpected problem such as a malfunction of the fluid pressure cylinder, the roller comes into contact with the cam outer periphery (at the portion thereof having the cam groove) to obviate an unnecessary operation of the operative device coupled to the cam device.

Figure 5:
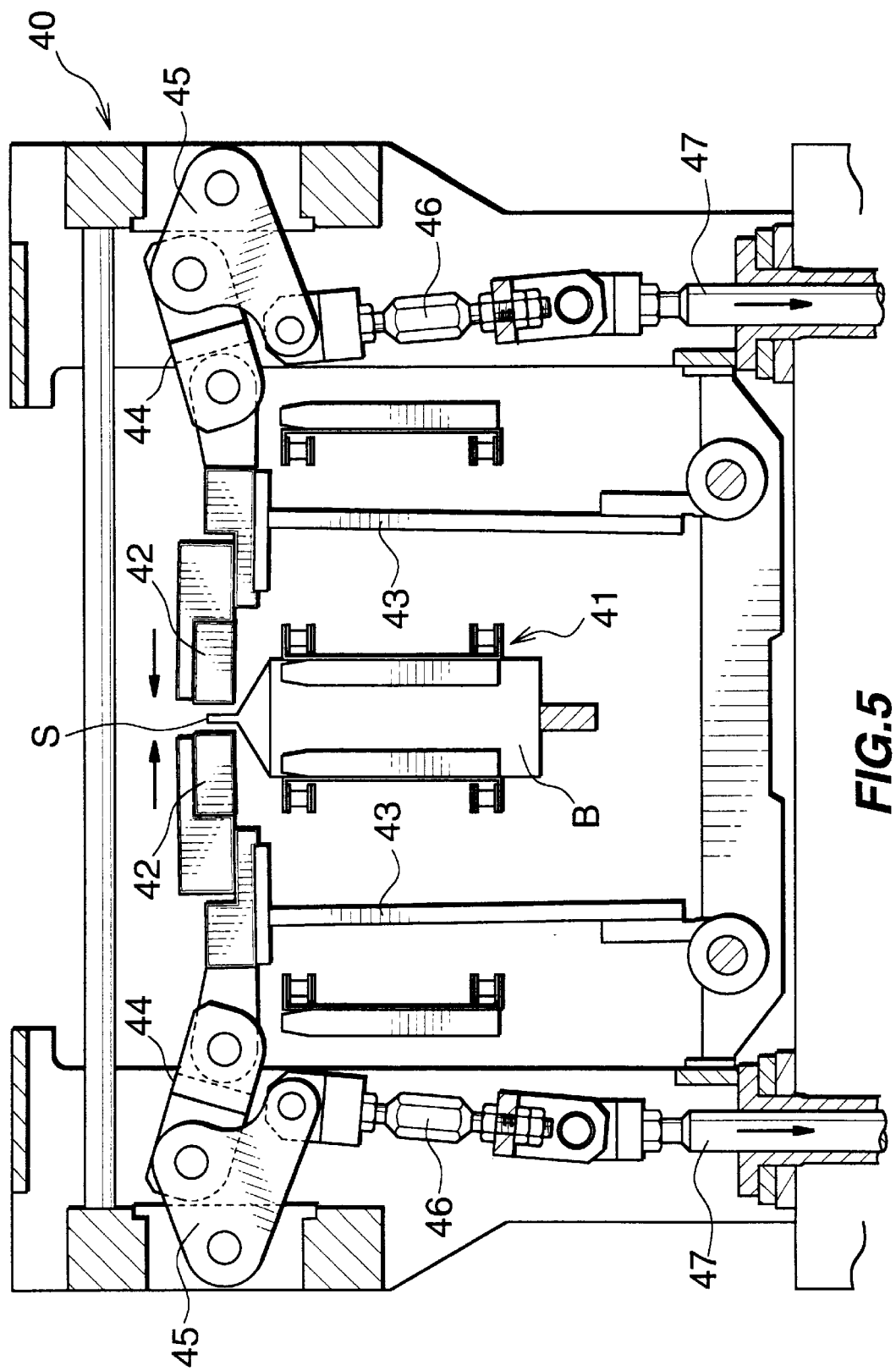
FIG. 5 is a front view of a container top sealing device drivable by the cam device.

FIG. 5 shows a container top sealing device 40 which is to be driven by the cam device. The device 40 is adapted to seal containers B during transport on a conveyor 41, each at an upper edge seal portion S of the top thereof by folding in the form of a gabled roof. The device 40 has a pair of sealing members 42 positionable at opposite sides of the seal portion S and movable toward and away from each other. The sealing members 42 are supported by the upper ends of a pair of vertical pivotal arms 43, respectively. Each of the pivotal arms 43 is connected by a link 44 to one end of an operating lever 45, the other end of which has the upper end of a lift rod 47 connected thereto by a connecting rod 46.

The cam lift diagram (FIG. 4) corresponds to the sealing operation in the following relationship. (Unillustrated means such as a lever mechanism is provided between the operating rod 26 and the lift rods 47, with the result that the operating rod 26 is reversed to the lift rods 47 in up-down stroke).

During the upper limit holding movement, the operating rod 26 is positioned in the lower position, with the lift rods 47 positioned in the upper position, to hold the sealing members 42 away from each other, or open. During the descending movement, the operating rod 26 is raised to lower the lift rods 47, moving the sealing members 42 toward each other. During the lower position holding movement, the operating rod 26 is positioned at the upper position, with the lift rods 47 positioned at the lower position, holding the sealing members 42 closed. During the ascending movement, the operating rod 26 is lowered to raise the lift rods 47, moving the sealing members away from each other.

During sealing, with the sealing members 42 held closed, there is a need to lower the lift rods 47 and to raise the operating rod 26. In this case, the follower 12 moves clockwise in FIG. 2, and the roller 25 acts to move away from the cam center, whereas the roller 25 is pressed by the groove-defining outer side face 32 and is therefore moved along the cam groove 22. Suppose the cam groove 22 is absent, and the roller 25 is movable in contact with the outer periphery of the cam in this case. This fluid pressure cylinder 13 then needs to have a very high pressure for preventing the roller 25 from moving out of contact with the cam outer periphery. However, the arrangement wherein the roller 25 moves along the cam groove 22 obviates such a need.

Figure 6:
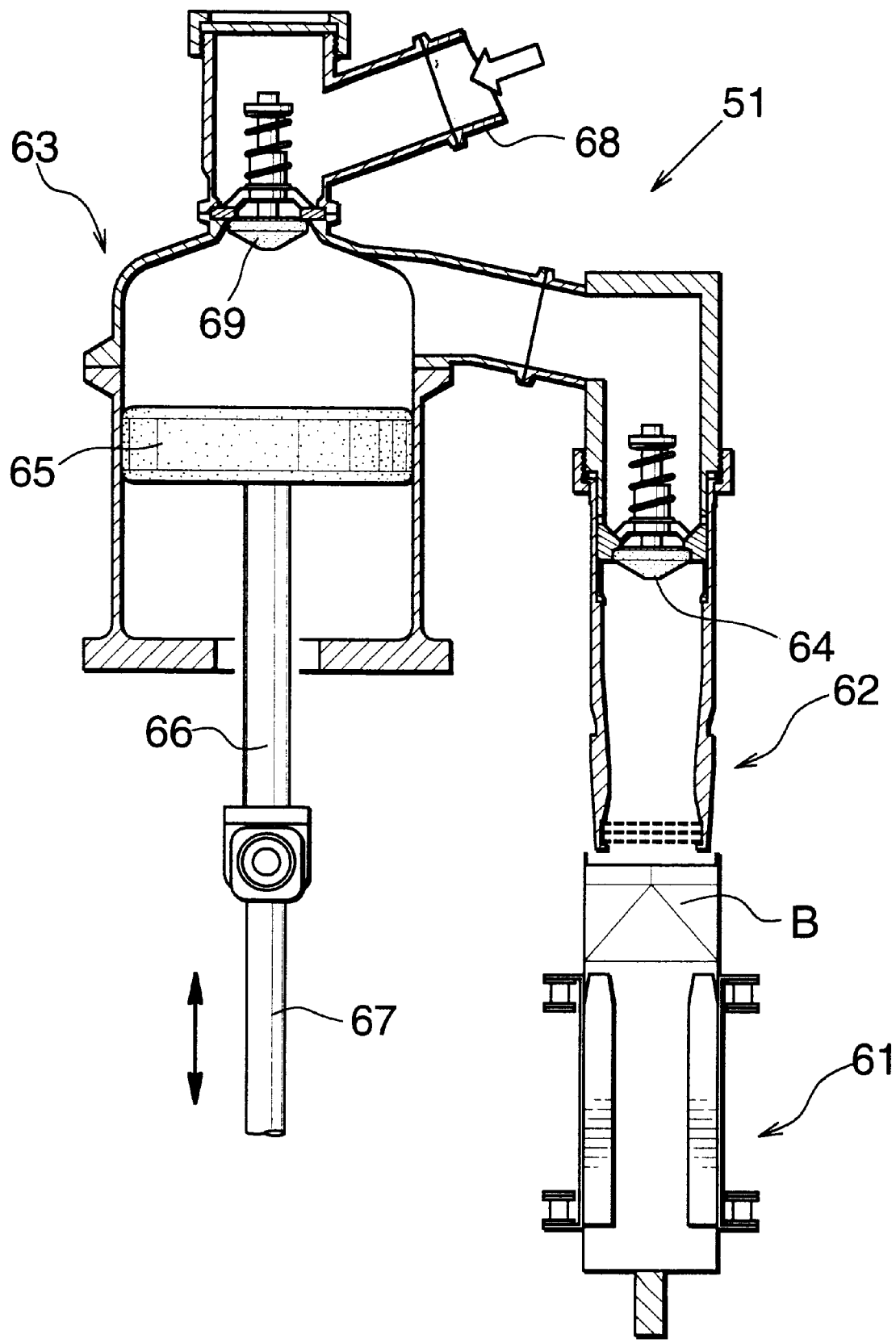
FIG. 6 is a front view of a container filling device drivable by the cam device.

FIG. 6 shows a container filling device 51. The device 51 comprises a vertical filling nozzle 62 disposed above a conveyor 61 for transporting containers B each having an open upper end, and metering cylinder 63 connected to the filling nozzle 62. The nozzle 62 has a downstream check valve 64 at an intermediate portion of its height. A piston 65 is housed in the metering cylinder 63 and has a piston rod 66 extending downwardly from the piston and projecting downwardly beyond the cylinder 63. A lift rod 67 is connected to the piston rod 66. Connected to the top of the metering cylinder 63 is a supply pipe 68 extending from a filling liquid tank (not shown). The supply pipe 68 has an open end provided with an upstream check valve 69.

The lift rod 67 is connected to the operating rod 26 of the cam device without any interposed means such as a lever. Accordingly, the lift rod 67 and the operating rod 26 are movable upwardly or downwardly.

During the upper position holding movement, the operating rod 26 is positioned at the lower limit, with the lift rod 67 and the piston 65 also positioned at the lower limit. The metering cylinder 63 is filled with the liquid to be filled into the container B. During the descending movement, the operating rod 26 is raised, and the lift rod 67 and the piston 65 are also raised, whereupon the downstream check valve 64 is opened, permitting the liquid to flow into the filling nozzle 62 from the metering cylinder 63 and causing the preceding liquid portion to flow out from the nozzle 62. During the lower position holding movement, the operating rod 26 is positioned at the upper limit, with the lift rod 67 and the piston 65 positioned at the upper limit. During the ascending movement, the operating rod 26 is lowered, and the lift rod 67 and the piston 65 are also lowered. At this time, the upstream check valve 68 is opened, permitting a supply of liquid to flow into the metering cylinder 63. The liquid flows into the nozzle 62 by the subsequent stroke.

The cam device of the invention is usable also for devices other than the container top sealing device and container filling device described.

Figure 7:
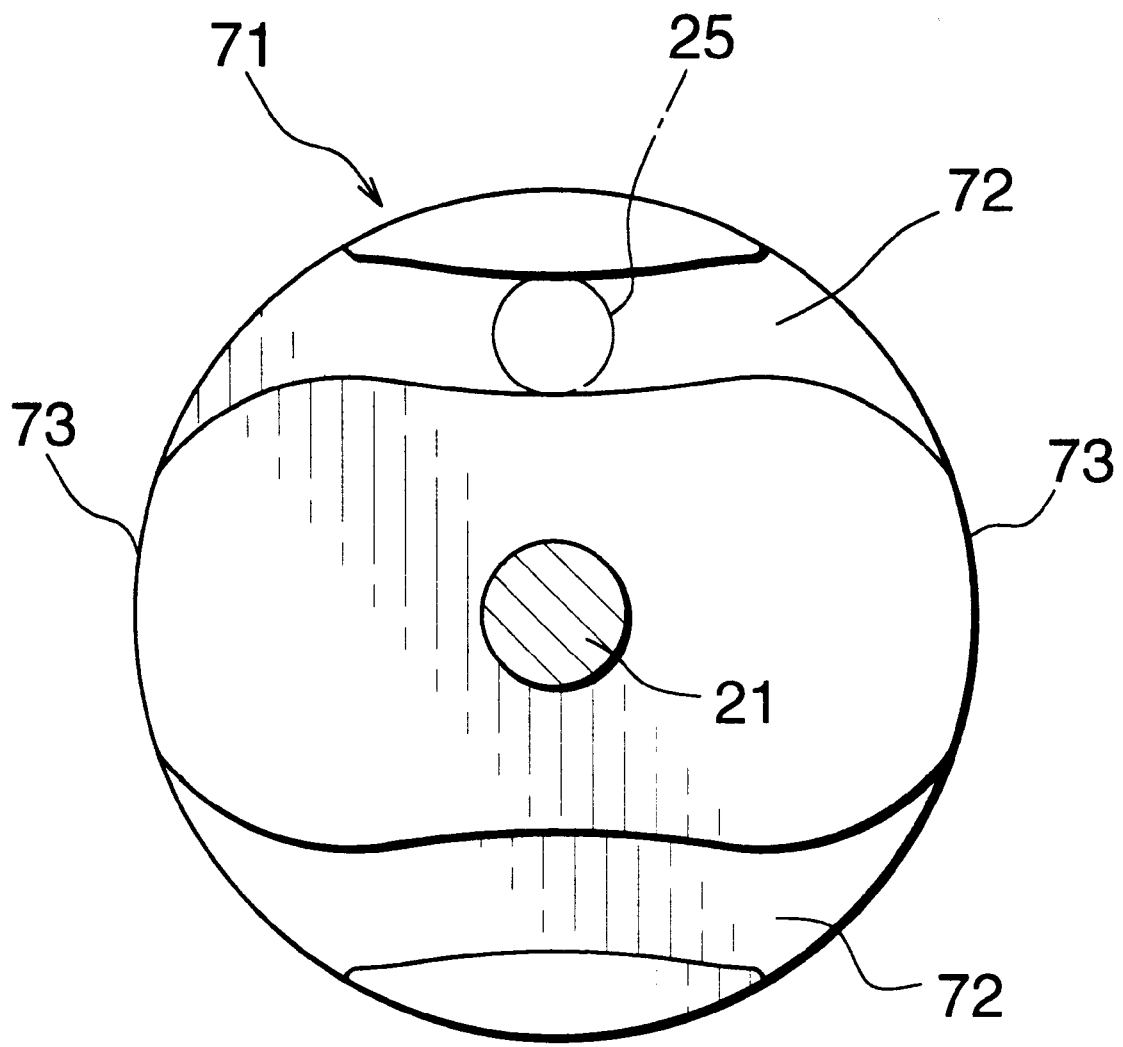
FIG. 7 is a side elevation of a modified cam.

The cam curve is not limited to the one already described but can be any desired curve as long as the curve has a cam groove and a cam contour face. Further as shown in FIG. 7, a cam 71 is also useful which has two cam grooves 72 in a side surface thereof and which has outer peripheral portions interconnecting the two cam grooves 72 at their opposite ends and serving as respective cam contour faces 73.

What is claimed is:

1. A cam assembly for an operative device, comprising:

a cam being in the form of a disk and formed in a side surface of the cam with a cam groove having opposite ends left open at an outer periphery of the cam, the cam outer periphery having a portion interconnecting opposite ends of a cam groove-defining inner side face and serving as a cam contour face;

a follower carrying a roller which is fittable in the cam groove and movable into contact with the cam contour face, the follower being in the form of a lever or an arm pivotally movable toward or away from the cam; and elastic means for causing the follower to follow the cam, the elastic means including a fluid pressure cylinder having a piston rod connected to the follower, wherein when the device is operative, the follower is urged by the elastic means inwardly so as to move the roller along the cam contour face and the cam groove whereby making the follower pivotally movable, while when the device is non-operative, the follower is retainable by the elastic means such that the roller is in contact with or away from the cam contour face whereby the follower is out of the pivotal movement, wherein the operative device is connected to the follower and has an operating member movable between an operative position where the operating member acts on an object and a nonoperative position, and the operating member is reciprocatingly movable between the operative position and the nonoperative position when the roller is fitted in the cam groove, the operative member being located in the nonoperative position when the roller is in contact with the cam contour face, and wherein the operative device is a container sealing device, and the object is a portion of a container to be sealed, the operating member comprising a pair of sealing members positionable at respective opposite sides of the container portion and movable between an open position and a closed position, the operative position being the closed position of the sealing members, the nonoperative position being the open position of the sealing members.

2. A cam assembly for an operative device, comprising:

a cam being in the form of a disk and formed in a side surface of the cam with a cam groove having opposite ends left open at an outer periphery of the cam, the cam outer periphery having a portion interconnecting opposite ends of a cam groove-defining inner side face and serving as a cam contour face;

a follower carrying a roller which is fittable in the cam groove and movable into contact with the cam contour face, the follower being in the form of a lever or an arm pivotally movable toward or away from the cam; and elastic means for causing the follower to follow the cam, the elastic means including a fluid pressure cylinder having a piston rod connected to the follower, wherein when the device is operative, the follower is urged by the elastic means inwardly so as to move the roller along the cam contour face and the cam groove whereby making the follower pivotally movable, while when the device is non-operative, the follower is retainable by the elastic means such that the roller is in contact with or away from the cam contour face whereby the follower is out of the pivotal movement, wherein the operative device is connected to the follower and has an operating member movable between an operative position where the operating member acts on an object and a nonoperative position, and the operating member is reciprocatingly movable between the operative position and the nonoperative position when the roller is fitted in the cam groove, the operative member being located in the nonoperative position when the roller is in contact with the cam contour face, and wherein the operative device is a container filling device having a filling nozzle and a metering cylinder housing a piston for feeding a liquid to the filling nozzle in a specified amount at a time by the reciprocating movement of the piston, and the object is the liquid as supplied to the metering cylinder, the operating member being a rod connected to the piston, the operative position being a rod retracted position, the nonoperative position being a rod advanced position.

3. A cam assembly for an operative device, comprising:

a cam being in the form of a disk and formed in a side surface of the cam with a cam groove having opposite ends left open at an outer periphery of the cam, the cam outer periphery having a portion interconnecting opposite ends of a cam groove-defining inner side face and serving as a cam contour face;

a follower carrying a roller which is fittable in the cam groove and movable into contact with the cam contour face; and elastic means for causing the follower to follow the cam, wherein when the device is operative, the follower is urged by the elastic means inwardly so as to move the roller along the cam contour face and the cam groove whereby making the follower pivotally movable, while when the device is non-operative, the follower is retainable by the elastic means such that the roller is in contact with or away from the cam contour face whereby the follower is out of the pivotal movement, wherein the operative device is connected to the follower and has an operating member movable between an operative position where the operating member acts on an object and a nonoperative position, and the operating member is reciprocatingly movable between the operative position and the nonoperative position when the roller is fitted in the cam groove, the operative member being located in the nonoperative position when the roller is in contact with the cam contour face, and wherein the operative device is a container sealing device, and the object is a portion of a container to be sealed, the operating member comprising a pair of sealing members positionable at respective opposite sides of the container portion and movable between an open position and a closed position, the operative position being the closed position of the sealing members, the nonoperative position being the open position of the sealing members.

4. A cam assembly for an operative device, comprising:

a cam being in the form of a disk and formed in a side surface of the cam with a cam groove having opposite ends left open at an outer periphery of the cam, the cam outer periphery having a portion interconnecting opposite ends of a cam groove-defining inner side face and serving as a cam contour face;

a follower carrying a roller which is fittable in the cam groove and movable into contact with the cam contour face; and elastic means for causing the follower to follow the cam, wherein when the device is operative, the follower is urged by the elastic means inwardly so as to move the roller along the cam contour face and the cam groove whereby making the follower pivotally movable, while when the device is non-operative, the follower is retainable by the elastic means such that the roller is in contact with or away from the cam contour face whereby the follower is out of the pivotal movement, wherein the operative device is connected to the follower and has an operating member movable between an operative position where the operating member acts on an object and a nonoperative position, and the operating member is reciprocatingly movable between the operative position and the nonoperative position when the roller is fitted in the cam groove, the operative member being located in the nonoperative position when the roller is in contact with the cam contour face, and wherein the operative device is a container filling device having a filling nozzle and a metering cylinder housing a piston for feeding a liquid to the filling nozzle in a specified amount at a time by the reciprocating movement of the piston, and the object is the liquid as supplied to the metering cylinder, the operating member being a rod connected to the piston, the operative position being a rod retracted position, the nonoperative position being a rod advanced position.

\* \* \* \* \*